(12) United States Patent
van Opdorp

(10) Patent No.: US 7,343,377 B1
(45) Date of Patent: Mar. 11, 2008

(54) METHOD AND SYSTEM FOR VERIFYING THE INTEGRITY OF A DATABASE

(75) Inventor: Damon Gerard van Opdorp, New Zealand (NZ)

(73) Assignee: Unisys Corporation, Blue Bell, PA (US)

( * ) Notice: Subject to any disclaimer, the term of this patent is extended or adjusted under 35 U.S.C. 154(b) by 535 days.

(21) Appl. No.: 10/614,527

(22) Filed: Jul. 7, 2003

(51) Int. Cl.
*G06F 7/00* (2006.01)
*G06F 17/00* (2006.01)

(52) U.S. Cl. .................. 707/100; 707/102; 707/104.1; 707/203; 707/103 R; 707/103 X; 707/103 Y; 707/103 Z

(58) Field of Classification Search ................ 707/101, 707/203, 102
See application file for complete search history.

(56) References Cited

U.S. PATENT DOCUMENTS

| | | | | |
|---|---|---|---|---|
| 5,819,291 | A * | 10/1998 | Haimowitz et al. ......... | 707/201 |
| 6,026,408 | A * | 2/2000 | Srinivasan et al. ...... | 707/103 R |
| 6,240,416 | B1 * | 5/2001 | Immon et al. ................. | 707/10 |
| 6,418,451 | B1 * | 7/2002 | Maimone .................... | 707/200 |
| 6,430,577 | B1 * | 8/2002 | Hart ........................... | 707/201 |
| 6,591,272 | B1 * | 7/2003 | Williams .................... | 707/102 |
| 6,807,632 | B1 * | 10/2004 | Carpentier et al. ......... | 713/165 |
| 6,957,221 | B1 * | 10/2005 | Hart et al. ................... | 707/100 |
| 7,010,546 | B1 * | 3/2006 | Kolawa et al. ......... | 707/103 R |
| 7,058,631 | B1 * | 6/2006 | Pal .............................. | 707/10 |
| 7,072,896 | B2 * | 7/2006 | Lee et al. .................... | 707/101 |
| 2002/0035482 | A1 * | 3/2002 | Coble et al. .................. | 705/1 |
| 2002/0038296 | A1 * | 3/2002 | Margolus et al. .............. | 707/1 |
| 2003/0069758 | A1 * | 4/2003 | Anderson et al. ............. | 705/3 |
| 2003/0182452 | A1 * | 9/2003 | Upton ........................ | 709/246 |
| 2004/0044680 | A1 * | 3/2004 | Thorpe et al. .............. | 707/102 |
| 2006/0064666 | A1 * | 3/2006 | Amaru et al. ............... | 717/100 |

* cited by examiner

*Primary Examiner*—Cam Y Truong
*Assistant Examiner*—Michael D Pham
(74) *Attorney, Agent, or Firm*—Richard J. Gregson

(57) ABSTRACT

A method for verifying the integrity of a database for use by an application. A process is applied to obtain (2) initial schema metadata (3) from the database (1). As a reference a reduced representation (5) is created (4) from the initial schema metadata (3) using an algorithm such as a hash function. The reduced representation is stored (6), preferably within the application. During execution of the application, the same process is applied to obtain (7) current schema metadata (8) from the database (1). A second reduced representation (10) is created (9) from the current schema metadata (8) using the same algorithm. The reduced representation (10) created as a reference is compared (11) with the second reduced representation (5). The result (12) of the comparison determines execution of the application. A system for implementing the method is disclosed. A system for verifying for a plurality of applications the integrity of one or more databases is also disclosed.

37 Claims, 8 Drawing Sheets

METHOD AND SYSTEM FOR VERIFYING THE INTEGRITY OF A DATABASE

FIELD OF INVENTION

The present invention relates to a method and system for verifying the integrity of a database for use by an application. More particularly, but not exclusively, the present invention relates to a method and system to verify the integrity of a database for use by an application by comparing schema metadata extracted from the database with previously extracted schema metadata.

BACKGROUND TO THE INVENTION

Where a central database is servicing multiple applications, either over a network or on a single computer system, and an application has the capacity to change the structure of the database, there is often a need for the other applications to monitor such changes to ensure that any changes made do not affect the operation of those applications.

Presently, applications do not check the structure of a database to assess whether it remains compatible with the application. An application is often only aware of critical changes to the structure of the database when a database query made by the application fails.

In order for the application to utilise a database effectively it is desired that the application is assured of the integrity of the structure of database before using it. Data which describes the structure of the database is called schema metadata. Schema metadata includes tables, columns in tables, datatypes of columns, lengths of columns, custom database data types, foreign keys, constraints, stored procedures, views, triggers, indices, and scheduled jobs.

To an application the variation of some elements of schema metadata may not be important. Therefore what is required is a method to verify the integrity of a database for use by a specific application. Integrity of the database concerns structural changes to the database which affect that particular application. Thus where structural changes do not affect an application the integrity of the database is maintained.

It is an object of the invention to provide a method and system to address the above problems or to at least provide the public with a useful choice.

SUMMARY OF THE INVENTION

According to a first aspect of the invention there is provided a method for a primary application to verify the integrity of a secondary application including the steps of:
  i. obtaining a reference reduced representation by:
    A. applying a process to obtain schema metadata from the secondary application;
    B. creating a reference reduced representation of the first obtained schema metadata using an algorithm; and
    C. storing the reference reduced representation;
  ii. during execution of the primary application, applying the process to obtain the schema metadata from the secondary application;
  iii. creating a second reduced representation of the second obtained schema metadata using the algorithm;
  iv. comparing the reference reduced representation and the second reduced representation; and
  v. controlling execution of the primary application dependent on the outcome of the comparison.

In a preferred implementation of the method the secondary application is a database.

The schema metadata may include tables, columns in tables, datatypes of columns, lengths of columns, custom database data types, foreign keys, constraints, stored procedures, views, triggers, indecies, or scheduled jobs.

Preferably the algorithm to create the reduced representations is a hash function, consequently the reduced representation is a hash of the schema metadata. The hash function may be MD5, CRC32, or any other contemporary hashing algorithm.

The algorithm may be a lossless compression algorithm, such as zip, gzip, or bzip2.

The reference reduced representation may be embedded within the source code for the primary application or within a configuration file for the primary application.

Step (i) for obtaining the reference reduced representation may be repeated more than once before steps (ii) to (v). This preferably occurs when an expected change occurs to the schema metadata of the database and a new reference for the database is required by the primary application.

Preferably the process includes organising the extracted schema metadata using a nested and determinable method. The method may be by alphabetical listing, default database order, creation date order, or by table owner.

In step (v) execution of the primary application may be controlled by halting the primary application, or sending an error message to any of the user, the application or database manager, or to the database itself.

A schema stability lock may be requested of the database. A schema stability lock prevents changes to the database schema. The lock may be obtained before step (iii). The lock may be maintained if the comparison is successful (the reference reduced representation and the second reduced representation match) in order that application can utilise the database without fear of the schema changing. The lock may be released if the comparison is unsuccessful. Alternatively, the lock may be obtained after step (iv) if the comparison is successful.

The process may be defined so that it obtains all available schema metadata. The process may be defined so that it only obtains schema metadata relevant to the operations of the primary application.

The process may utilize SQL92 standard which is widely implemented by databases such as Oracle and SQL Server. An example of this is the view "INFORMATION_SCHEMA.TABLES" which lists the tables in a database.

The process may utilize the services of a standard driver API for the database. The process may utilize the JDBC API provided within Java. Contained in JDBC is a class called "java.sql.DatabaseMetaData" which provides mechanisms to get tables in a schema and other metadata from the database.

According to a further aspect of the invention there is provided a system for verifying for a plurality of applications the integrity of one or more databases including:
  i. a plurality of applications adapted to store a plurality of previously calculated reduced representations of schema metadata for one or more databases, to extract a plurality of schema metadata from one or more databases, to newly calculate a plurality of reduced representations from the plurality of extracted schema metadata, and to compare each of plurality of previously calculated reduced representations with its corresponding newly calculated reduced representation; and ii. one or more databases adapted to receive requests for schema metadata from the plurality of applications and to transmit schema metadata to the plurality of applications.

The plurality of applications may be deployed on a plurality of user computer devices. The one or more of databases may be deployed on one or more server computer devices. The user computer devices and the server computer devices may be connected via a network such as LAN, WAN, or the Internet.

According to a further aspect of the invention there is provided a system for verifying for an application the integrity of a database including:

i. an application;
ii. a stored reduced representation of schema metadata of a database; and
iii. a verification engine which upon connection to a database obtains a reduced representation of schema metadata from the database and compares it with the stored reduced representation to control the application.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention relates to a method and system for verifying the integrity of a database for use by an application.

Figure 1:
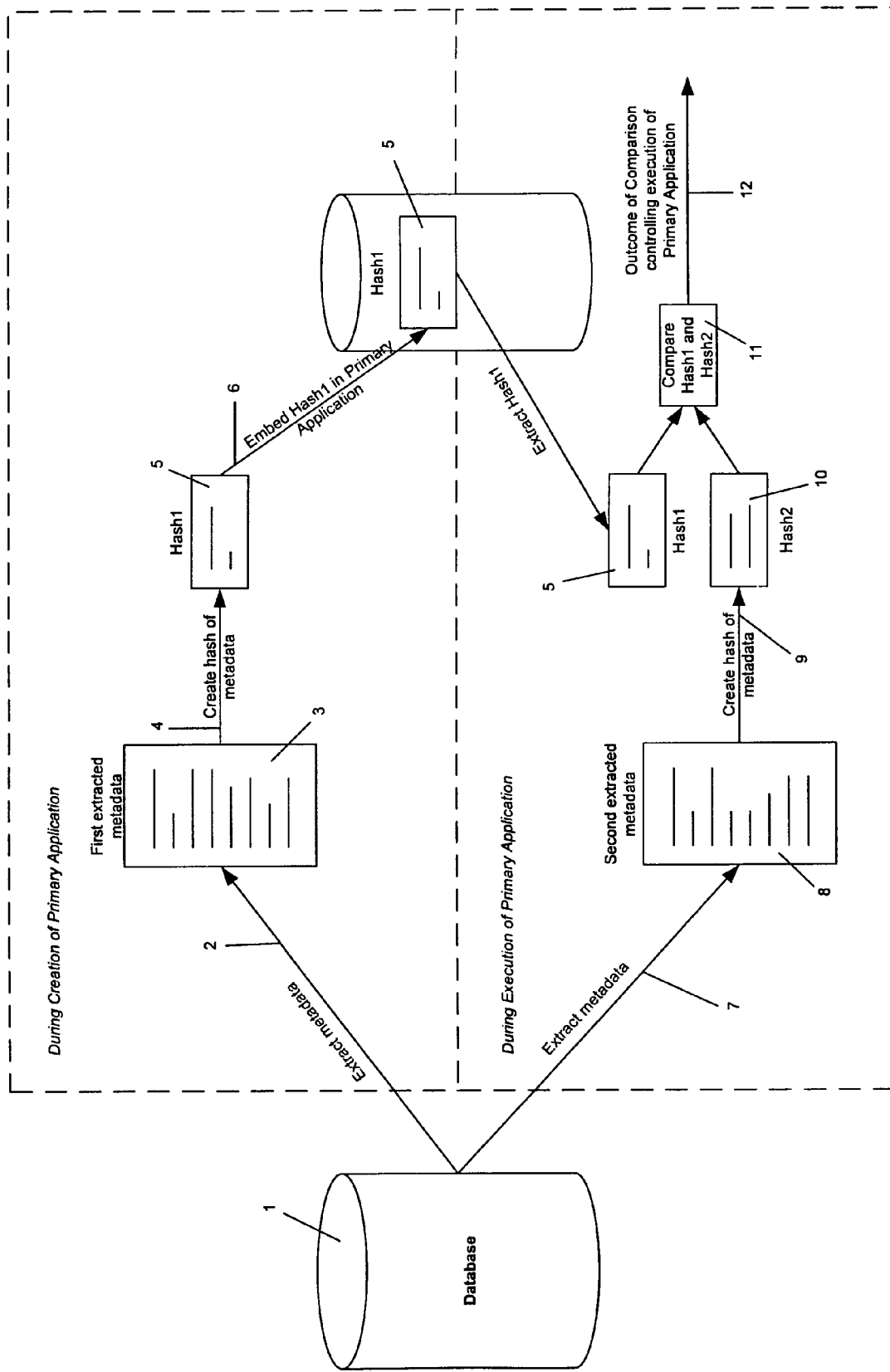
FIG. 1: shows a flow diagram illustrating the method of the invention.

The invention will now be described with reference to FIG. 1 of the drawings.

Reference Creation Stage

During the build (creation) of an application, a database 1, which the application will during its execution, is queried to extract in step 2 schema metadata 3. Schema metadata is information that describes the structure and other features of a database and is agnostic to the actual data stored in the database. Schema metadata includes tables, columns in tables, datatypes of columns, lengths of columns, custom database data types, foreign keys, constraints, stored procedures, views, triggers, indices, and scheduled jobs.

The set of schema metadata that is extracted is typically that metadata which would adversely affect operation of the application if it changed. Therefore it may not be necessary to extract the entire set of schema metadata. Circumstances such as an application's sensitivity to indices will vary from application to application and the set of schema metadata that is to be extracted shall vary appropriately.

For some applications full schema extraction will be best. Full schema extraction is particularly desirable for many large and performance orientated applications. Full schema extraction may include not only the schema in which data resides but also other aspects such as indices if these are essential to the correct functioning of the application.

For applications that are installed in multiple places, it may be desirable to ignore the indices that are present in the database. For example two sites may run the same application, but use that application in different ways. For performance reasons the sites may choose to have different indices to reflect the nature of their data and usage.

Some applications allow user defined tables. In such circumstances it is not possible to create a reference reduced representation for as yet undefined tables when the application is built. In such cases only tables that will be constant for the application should be included in the set of schema metadata to be extracted.

For example, if an application only needs the database to query an "email contacts" table to extract a "phone number" by "name", then the metadata the application is concerned about is (a) the existence of a "email contacts" table, (b) the existence of a "name" column, and (c) the existence of a "phone number" column. The application is unconcerned about the existence of an "email addresses" column. Correspondingly, the metadata extracted by the application would be (a), (b), and (c).

There are a number of ways to extract schema information.

Database vendors generally have product and version specific ways to extract data from their database. SQL Server has version specific stored procedures such as "sp_tables" for listing tables in a database and "sp_columns" for listing columns in a table.

There is a vendor neutral method for retrieving schema information that is part of the SQL92 standard and widely implemented by databases such as Oracle and SQL Server. An example of this is the view "INFORMATION_SCHEMA.TABLES" which lists the tables in a database.

Another method for getting schema information is to use the services of a standard driver API. Java has a specification for dealing with a database called JDBC. Contained in this is a class called "java.sql.DatabaseMetaData". This provides mechanisms to get tables in a schema and other metadata from the database.

The extracted metadata is organised using a method which results in a nested and determinable order, such as alphabetically. For example, if the schema metadata to be extracted was a "Clients" table with columns "Name", "Address", "Phone" and a "Files" table with columns 'File Number', "Client"; then the resulting ordered metadata list would be "Clients, Address, Name, Phone, Files, Client, File Number".

Other methods of ordering include:
by default database order
by creation date order
by table owner The organised extracted metadata is compressed in step 4 using a hash function into a reduced form 5. A good hash function will produce a difficult to forge representation which uniquely identifies the schema metadata. Examples of good contemporary hash functions include MD5 and CRC32.

It will be appreciated that other methods of cryptography or compression may be used to create the reduced form of the metadata, including, lossless compression algorithms such as zip, gzip, and bzip2.

This reduced form or hash is stored in step 6 as a reference for the correct configuration of the database. Preferably, the reduced form is stored by embedding into the application or within an application configuration file.

The reference creation stage may occur again during the life of the application. For example, when the application is aware (or initiates) an expected change to the structure of the database.

Verification Stage

During execution of the application, the database 1 is queried to extract in step 7 the same type of schema metadata 8 as during the Reference Creation Stage. This metadata is organised using the same method used during the Reference Creation Stage and then compressed in step 9 using the same algorithm used during the Reference Creation Stage to create a runtime reduced form 10. The runtime reduced form 10 is compared in step 11 with the reference reduced form 5 which was embedded in the application.

The outcome 12 of this comparison controls the execution of the application.

For instance, when the runtime reduced form differs from the embedded reduced form, this indicates that relevant metadata within the database has changed. If the runtime reduced form is identical to the embedded reduced form this indicates that it is very unlikely that relevant metadata within the database has changed. In the case of the former, the application may stop execution, generate an error message, or take actions against the database. In the case of the latter, the application can confidently query the database in the knowledge that the queries are likely to succeed.

The verification process may occur several times during the execution of the application, especially in the case where the application continues execution over a significant period of time, or it may only occur at the start of the application. To ensure that the database does not change after the verification process and before a query is made of the database, a schema stability lock, such as a "SQL Server 2000 schema stability lock", may be requested of the database.

A SQL Server 2000 schema stability lock on a table prevents other processes from acquiring locks that alter the structure of a table. The abbreviated name for this lock type is "Sch-S". The method may use schema stability locks to guarantee that the schema of tables doesn't change between database integrity verification. This prevents the application getting out of match with the database even if some process is attempting to alter the database structure.

Figure 2:
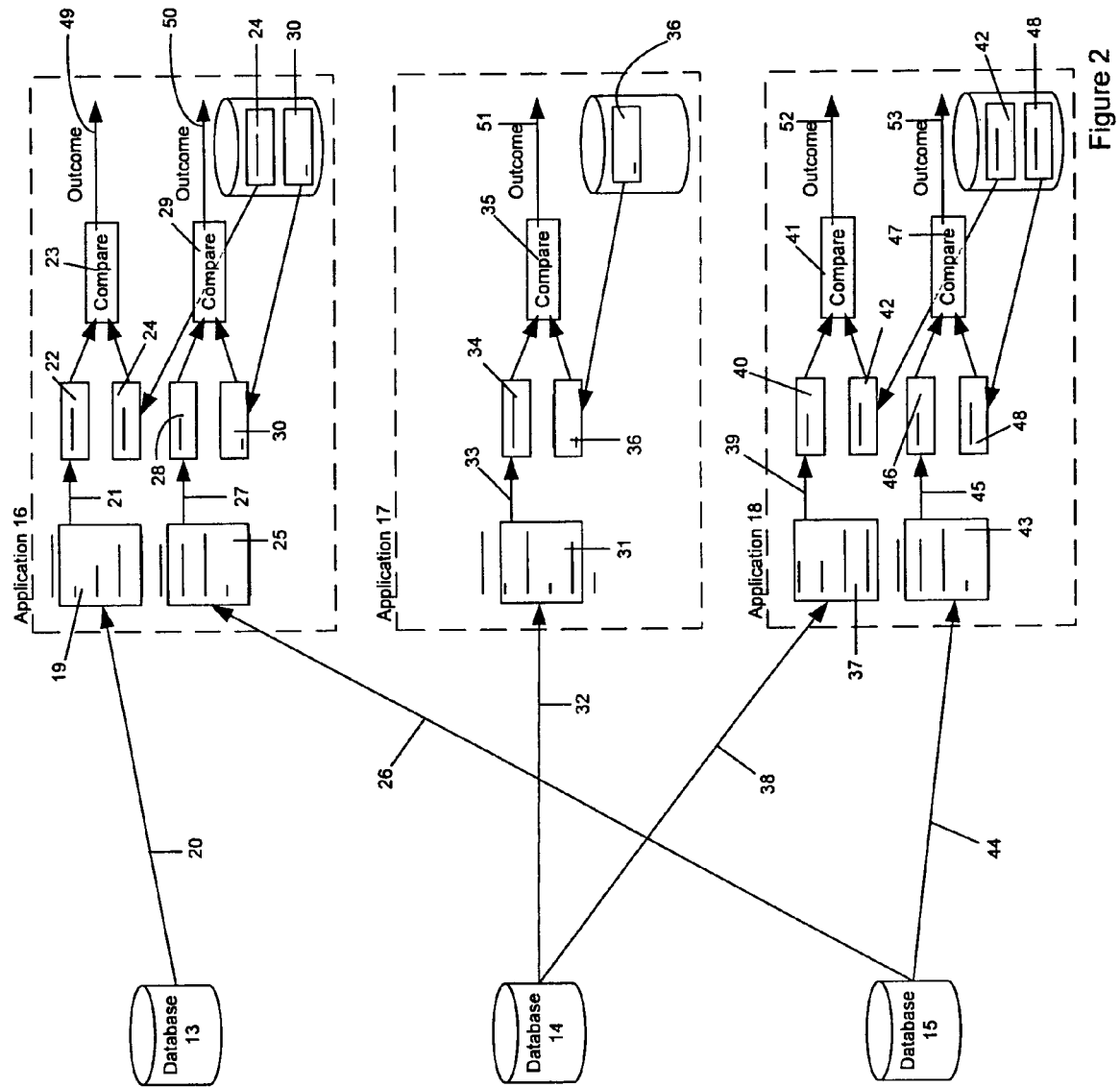
FIG. 2: shows a flow diagram illustrating the verification stage of the method for a plurality of databases and applications.

Referring to FIG. 2, a second implementation of the invention will be described.

In this implementation there are a plurality of databases 13, 14, and 15 and a plurality of applications 16, 17, and 18. Several of the databases 14 and 15 are utilised by more than one application, and several of the applications 16 and 18 utilise more than one database.

For each of the applications, reduced representations of each utilised database's metadata has been stored in a manner accessible by that application. The representations can be stored in the application's configuration file, or embedded within the application itself if the representations were obtained at or before build time of the application.

FIG. 2 shows the verification process used by each application to ascertain the integrity of the databases they are using.

Application 16 is using databases 13 and 15. Therefore during execution of application 16 the following will take place:

i) Metadata 19 referring to aspects of database 13 used by application 16 is extracted from database 13, a hash algorithm is applied in step 21 to form a reduced representation 22 of the metadata and this is compared in step 23 with the stored reduced representation 24 to confirm the integrity of database 13 for use by application 16.

ii) Metadata 25 referring to aspects of the database 15 used by application 16 is extracted in step 26 from database 15, a hash algorithm is applied in step 27 to form a reduced representation 28 of the metadata and this is compared in step 29 with the stored reduced representation 30 to confirm the integrity of database 15 for use by application 16.

Application 17 is using database 14. Therefore during execution of application 17 the following will take place:

i) Metadata 31 referring to aspects of database 14 used by application 17 is extracted in step 32 from database 14, a hash algorithm is applied in step 33 to form a reduced representation 34 of the metadata and this is compared in step 35 with the stored reduced representation 36 to confirm the integrity of database 14 for use by application 17.

Application 18 is using databases 14 and 15. Therefore during execution of application 18 the following will take place:

i) Metadata 37 referring to aspects of database 14 used by application 18 is extracted in step 38 from database 14, a hash algorithm is applied in step 39 to form a reduced representation 40 of the metadata and this is compared in step 41 with the stored reduced representation 42 to confirm the integrity of database 14 for use by application 18.

ii) Metadata 43 referring to aspects of the database 15 used by application 18 is extracted in step 44 from database 15, a hash algorithm is applied in step 45 to form a reduced representation 46 of the metadata and this is compared in step 47 with the stored reduced representation 48 to confirm the integrity of database 15 for use by application 18.

The stored reduced representation 36 for database 14 for application 17 is different to the stored reduced representation 42 for database 14 for application 18 because application 17 and application 18 use different aspects of database 14.

The outcomes 49, 50, 51, 52, and 53 of the comparisons 23, 29, 35, 41, and 47 will control the execution of each application.

It will be appreciated that any lossy or lossless algorithm which creates reduced representations may be used. There is no requirement to recreate the actual metadata extracted therefore the preferred algorithm favours high compression over data loss. There is a requirement that any minor changes to the metadata are detected therefore an algorithm with properties similar to a hash function is preferred.

EXAMPLE 1

Figure 3:
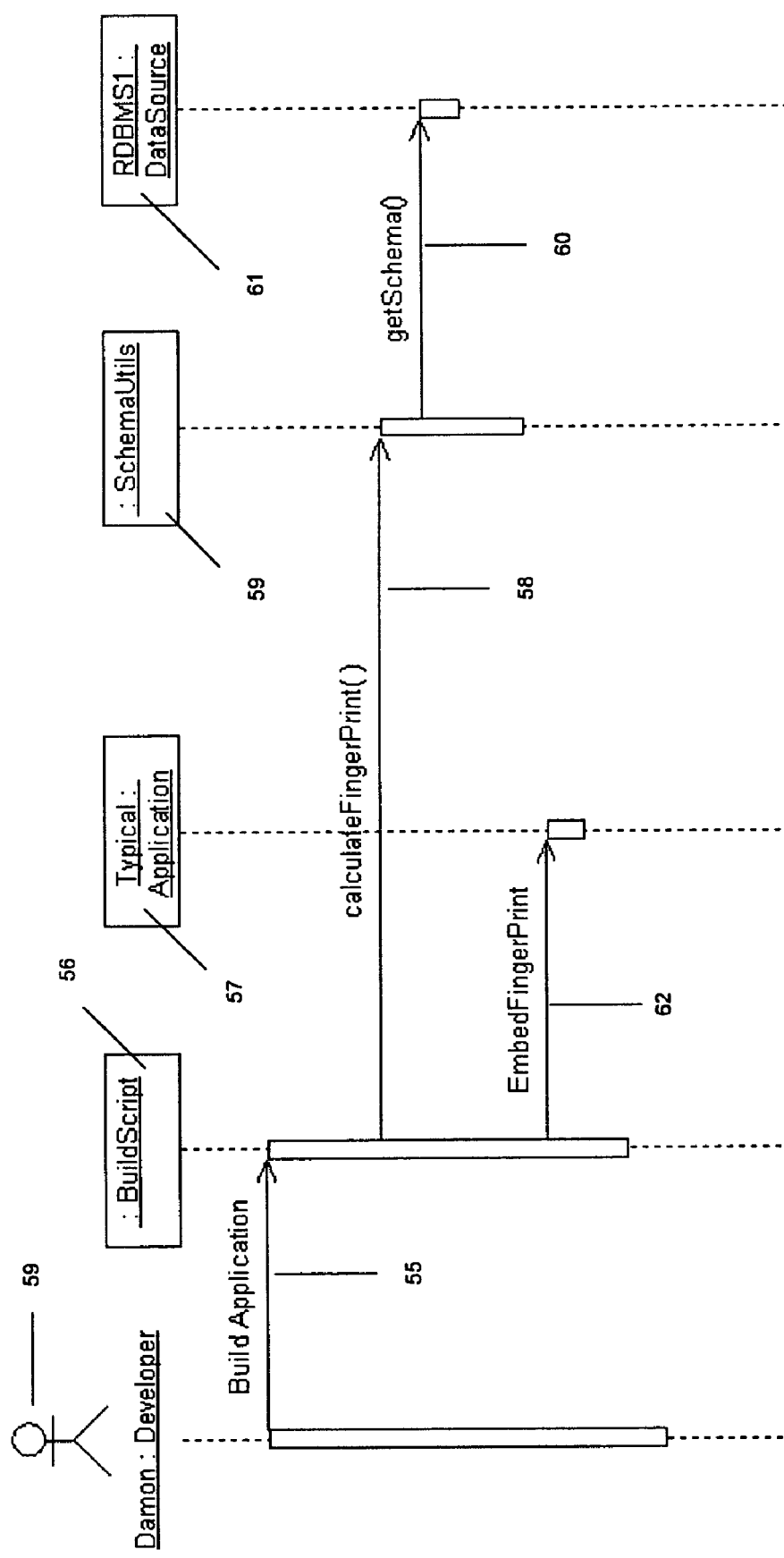
FIG. 3: shows a sequence diagram illustrating the reference creation stage of a first example of the method.
Figure 4:
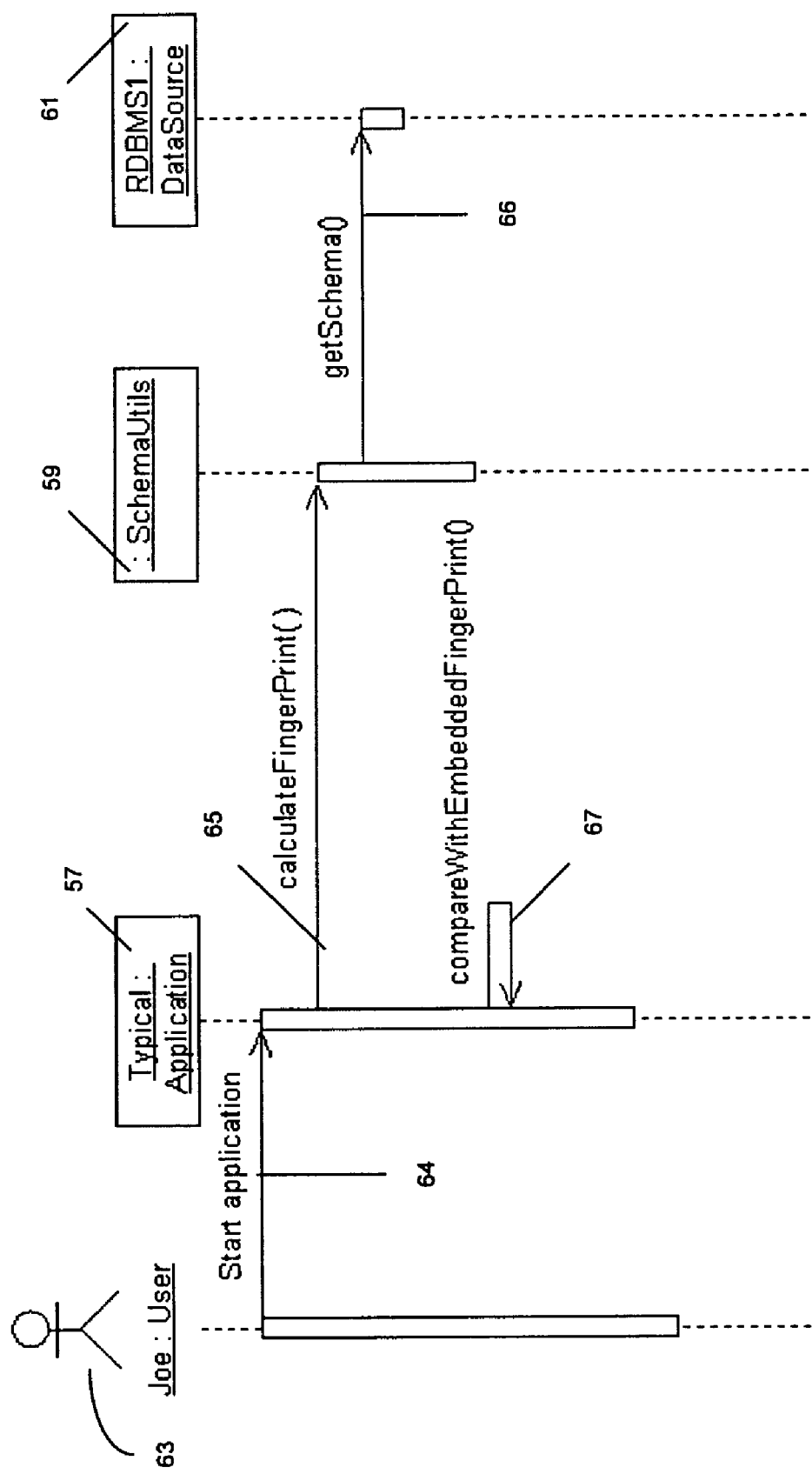
FIG. 4: shows a sequence diagram illustrating the verification stage of a first example of the method.

A preferred implementation of the invention will now be described with reference to FIGS. 3 and 4.

Reference Creation Stage

In this example an application developer 54 instructs in step 55 the build script 56 to build the application 57. The build script 56 calls in step 58 a function from a module "schema utilities" 59 which obtains in step 60 a schema from RDBMS1 61—the data source which is to be used by the application—and calculates a fingerprint—a reduced representation of the schema which can be used to identify the schema in future—from the schema data The fingerprint is embedded in step 62 in the application 57.

Verification Stage

A user 63 of the application 57 starts in step 64 the application. Sometime during its execution, the application 57 calls in step 65 a function from the module "schema utilities" 59 which obtains in step 66 a schema from RDBMS1 61 and calculates a new fingerprint from the schema.

The new fingerprint is compared in step 67 with the embedded fingerprint.

If the RDBMS1 schema has not changed since the application was built then the comparison will return a match. If the fingerprints do not match then the schema has changed. The application may choose to stop execution at this point, it may notify the user or a database/application manager, or it may send a message to the data source.

EXAMPLE 2

Figure 5:
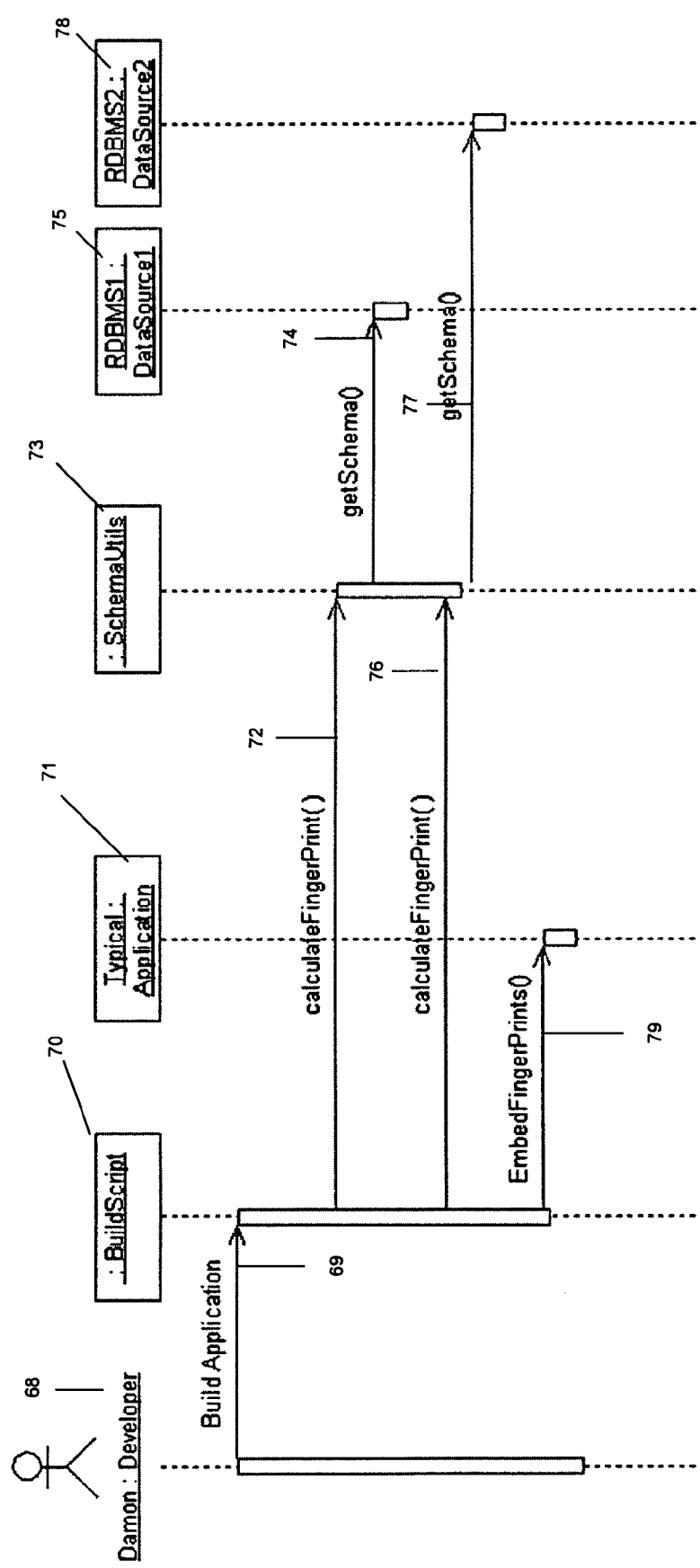
FIG. 5: shows a sequence diagram illustrating the reference creation stage of a second example of the method.
Figure 6:
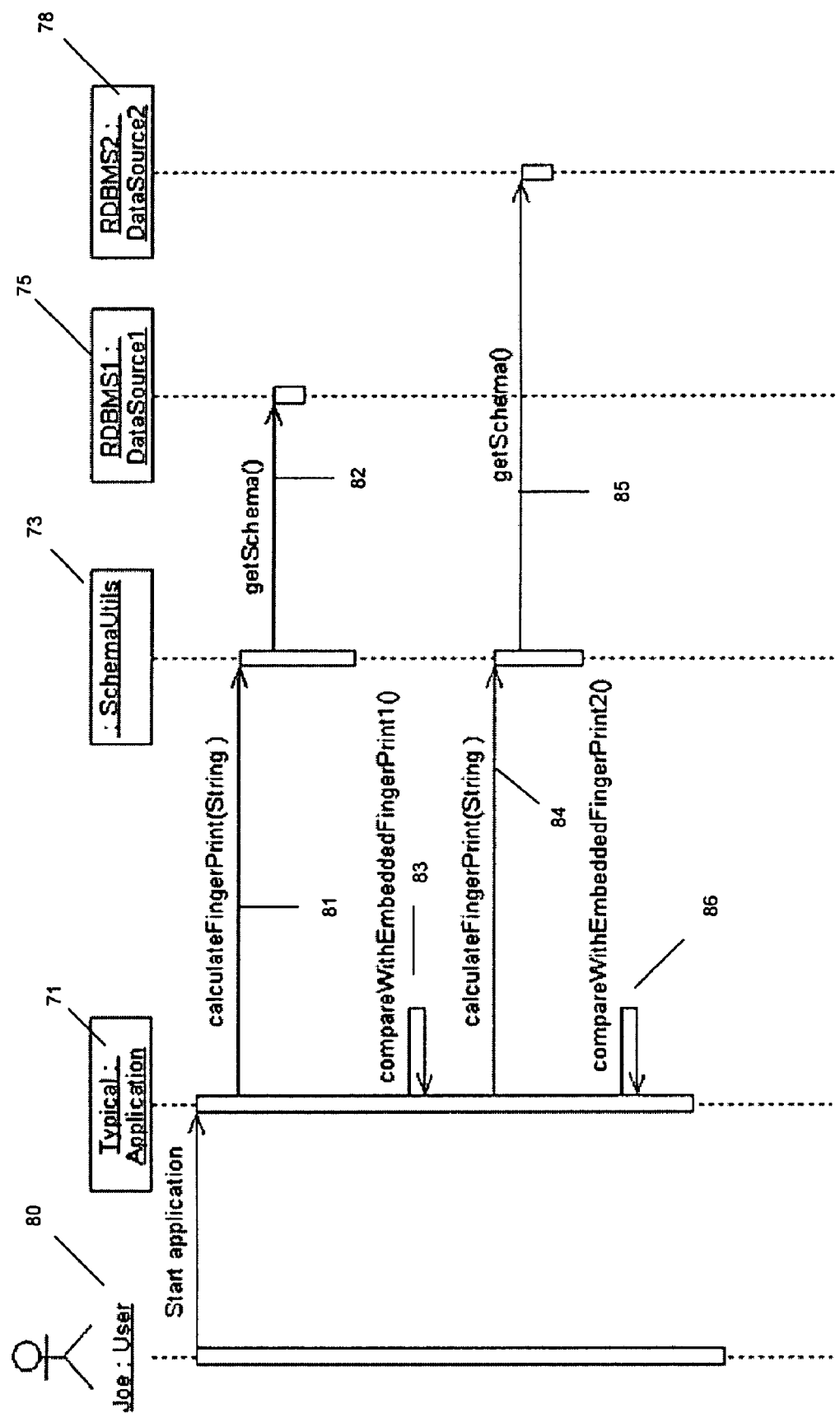
FIG. 6: shows a sequence diagram illustrating the verification stage of a second example of the method.

An implementation of the invention will now be described with reference to FIGS. 5 and 6. This implementation relates to an application which needs to verify the integrity of two data sources.

Reference Creation Stage

In this example an application developer 68 instructs in step 69 a build script 70 to build the application 71. The build script 70 calls in step 72 a function from a module "schema utilities" 73 which obtains in step 74 a schema from RDBMS1 75, a first data source to be used by the application, and calculates a fingerprint from the RDBMS1 schema data.

The build script 70 calls in step 76 a function from a module "schema utilities" 73 which obtains in step 77 a schema from RDBMS2 78, a second data source to be used by the application 71, and calculates a fingerprint from the RDBMS2 schema data.

Both fingerprints are embedded in step 79 in the application.

Verification Stage

A user 80 of the application starts the application 71. Sometime during its execution, the application 71 calls in step 81 a function from a module "schema utilities" 73 which obtains in step 82 a schema from RDBMS1 75 and calculates a new fingerprint from the schema.

The new fingerprint is compared in step 83 with the embedded RDBMS1 fingerprint.

If the RDBMS1 schema has not changed since the application was built then the comparison will return a match. If the fingerprints do not match then the schema has changed. The application may choose to stop execution at this point, it may notify the user or a database/application manager, or it may send a message to the data source.

Sometime during its execution, the application 71 calls in step 84 a function from a module "schema utilities" 73 which obtains in step 85 a schema from RDBMS2 78 and calculates a new fingerprint from the schema.

The new fingerprint is compared in step 86 with the embedded RDBMS2 fingerprint.

If the RDBMS2 schema has not changed since the application was built then the comparison will return a match. If the fingerprints do not match then the schema has changed. The application may choose to stop execution at this point, it may notify the user or a database/application manager, or it may send a message to the data source.

Figure 7:
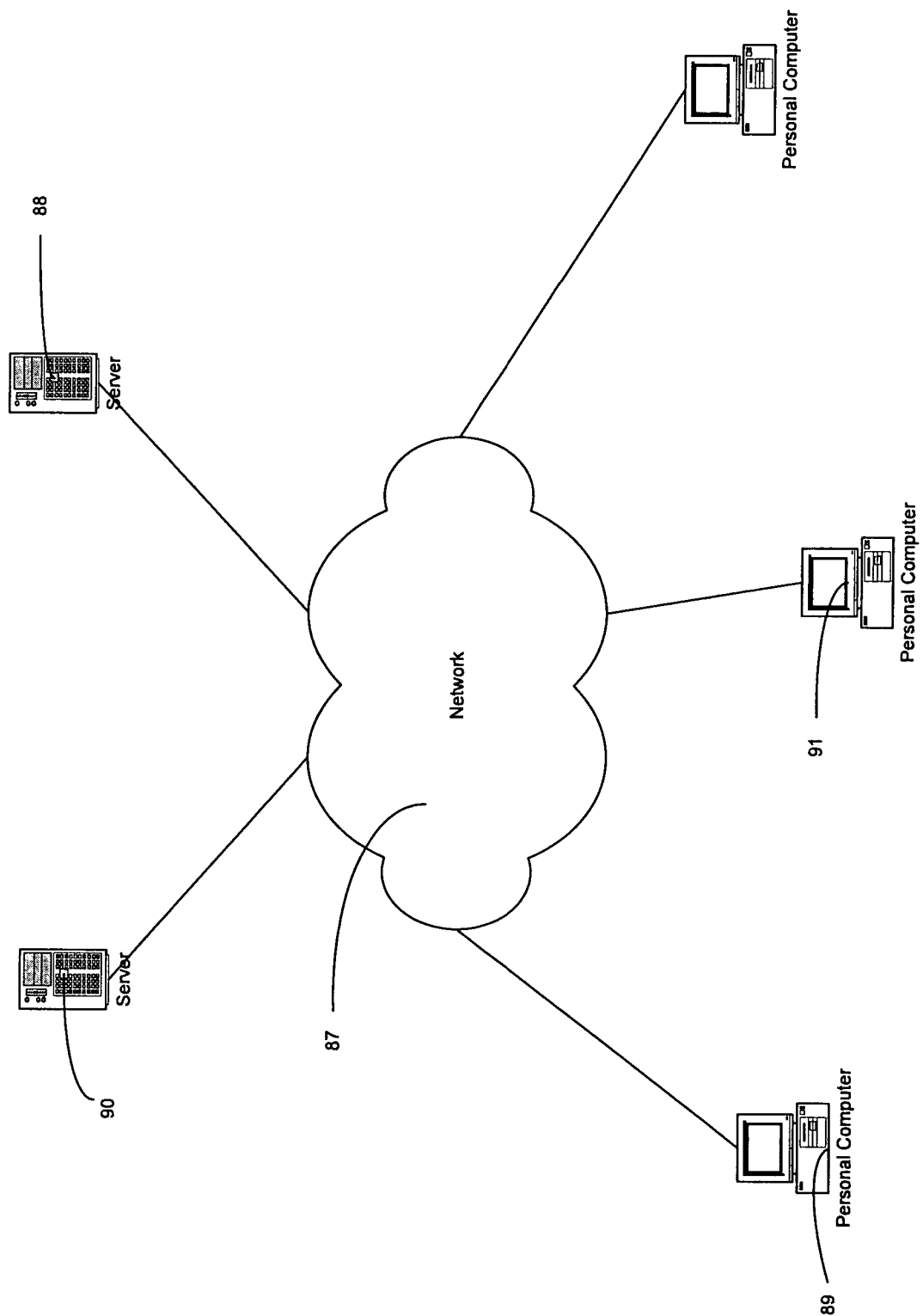
FIG. 7: shows a diagram illustrating how the method may be deployed on hardware.

FIG. 7 illustrates how the invention may be deployed on hardware.

The primary application and secondary application are deployed over a network 87. The network may be a LAN, WAN, or the Internet.

The secondary application is typically a database and in this example is deployed on a server 88 linked to the network 87. The primary application is typically a user application and in the example is deployed on a personal computer 89 linked to the network 87.

It will be appreciated that the personal computer may be of any hardware configuration, such as an IBM Pentium 4 with 256 MB of RAM and a 40 GB hard drive.

In situations where there is a plurality of secondary applications these may be deployed on separate servers or on the same server. In this example an additional database is deployed on a separate server 90.

In situations where there is a plurality of primary applications these may be deployed on separate personal computers or on the same personal computer. In this example an additional primary application is deployed on a separate personal computer 91.

It will be appreciated by a skilled reader that both the primary application and the secondary application may be deployed on a single computer. For example, a single IBM Pentium 4 with 256 MB of RAM and a 40 GB hard drive running a Windows 2000 operating system It will further be appreciated that a plurality of primary applications and secondary applications may be deployed on a single computer. For example, a single IBM Pentium 4 with 256 MB of RAM and a 40 GB hard drive running a Windows 2000 operating system, including an ORACLE database for a payroll (first database) and a MICROSOFT ACCESS database (second database) for office stationary. The computer further including a first primary application, such as an integrated office management application interfaced to both databases, and a second primary application, such as an office stationary monitoring application interfaced to the second database.

Figure 8:
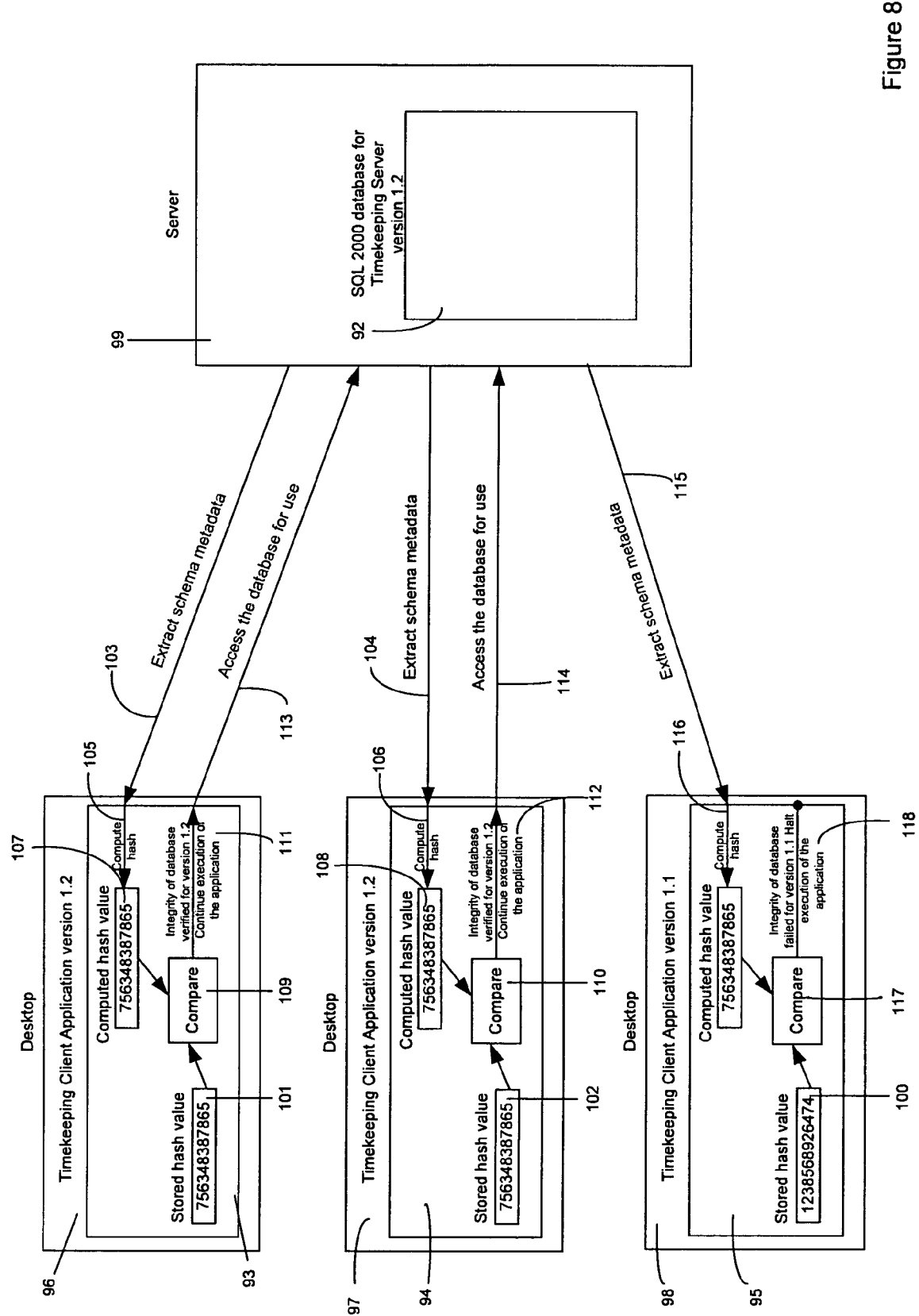
FIG. 8: shows a diagram illustrating a possible implementation of the method.

Referring to FIG. 8 an example of how the invention might be implemented will be described.

The example concerns a client/server architecture timekeeping system for professionals, such as lawyers. Such a system is comprised of a central database 92 storing all data, and a number of client applications 93, 94 and 95 on the professionals' desktops 96, 97 and 98.

The client applications 93, 94, and 95 communicate with the database server 99 directly. The database 92 is a SQL Server 2000 database. The client applications 93, 94, and 95 are written in Java.

Version 1.1 of the client application was initially deployed on all the desktops. This version had a stored hash value 100 of schema metadata extracted from the database.

The timekeeping system was modified and changes were made to the schema of the database. The new 1.2 version of the client application 93 and 94 was rolled out to the desktops 96 and 97. The version 1.2 client applications 93 and 94 have hash values 101 and 102 of the version 1.2 database's modified schema metadata embedded within them.

During the upgrade process, one desktop 98 missed out on the new version and is still running version 1.1 of the client application 95.

When the version 1.2 client applications 93 and 94 on the desktops 96 and 97 they extract schema metadata in steps 103 and 104 from the database 92, compute in steps 105 and 106 the hash values 107 and 108 of the schema metadata, and compare in steps 109 and 110 the computed hash values 107 and 108 to the stored hash values 101 and 102. As the database is also version 1.2, the comparison reveals a match between the computed hash values 107 and 108 and the stored hash values 101 and 102. As a result of the match the applications continue normal execution, in steps 111 and 112, which involves use, in steps 113 and 114, of the database.

When version 1.1 of the client application 95 executes, on the desktop 98 that missed out on the upgrade, it extracts schema metadata 115, computes 116 the hash value, and compares 117 it with the stored hash value 100. As the stored hash value 100 is for version 1.1 of the database, the comparison will return a mismatch. As a result of the mismatch the client application will cease execution 118 in order to avoid potential data loss within the database 92.

The invention provides numerous advantages including:
potential elimination of schema and SQL statement mismatches resulting in runtime errors;
potential to reduce chance of data loss due to schema mismatch;
detection of mismatches of various kinds before any data processing is attempted;
various schema matching algorithms to detect only the kind of schema mismatches that an application is sensitive to;
storing the schema in a reduced form to minimise storage space in client applications;
by schema matching on meta data instead of literal data such as a table with an application version number, the possibility that the literal data could be erroneously modified is eliminated; and
detection of mismatch at the earliest possible time.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:
1. A computer implemented method for a primary application to provide an indication of integrity of a database including the steps of:
   i. obtaining a first reference reduced representation by:
      a. applying a process to obtain first schema metadata of a database structure of a database, where the first schema metadata is selected from a set of tables, columns in tables, data types of columns, lengths of columns, custom database data types foreign keys, constraints, stored procedures, views, triggers, indices, and scheduled jobs;
      b. creating a first reference reduced representation of the first obtained schema metadata using an algorithm, where the algorithm is a hash function selected from a set of MD5 (Message-Digest algorithm 5) and CRC32 (Cyclic redundancy check 32); and
      c. storing the first reference reduced representation by embedding the first reference reduced representation within configuration files for the primary application;
   ii. during execution of the primary application, applying a process to obtain second schema metadata of the database structure of a same database, where the second schema metadata is selected from the set of tables, columns in tables, data types of columns, lengths of columns, custom database data types foreign keys, constraints, stored procedures, views, triggers, indices, and scheduled jobs;
   iii. creating a second reduced representation of the second obtained schema metadata using the algorithm;
   iv. comparing the stored first reference reduced representation with the created second reduced representation so as to provide an indication of the integrity of the database by determining whether the database structure changed during a time when the first reference reduced representation and second reduced representation were obtained;
   v. controlling execution of the primary application dependent on the indication, where the execution of the primary application is controlled by the primary application sending an error message to one selected from a set of a user of the primary application, a manager of the primary application, a manager of the database and the database; and
   vi. requesting a schema stability lock to guarantee that the schema of the database does not change between subsequent database integrity verifications.

2. The method as claimed in claim 1, wherein the algorithm is a lossless compression algorithm.

3. The method as claimed in claim 2, wherein the lossless compression algorithm is one selected from the set of zip, gzip, and bzip2.

4. The method as claimed in claim 1, wherein the first reference reduced representation is stored by embedding representation within the primary application.

5. The method as claimed in claim 1, wherein step (i) is repeated before (ii) to (v) at least one time when an expected change occurs to the schema metadata in the database.

6. The method as claimed in claim 1, wherein the process includes organizing extracted schema metadata using a nested and determinable method.

7. The method as claimed in method 6, wherein the nested and determinable method is by alphabetical listing of schema metadata elements.

8. The method as claimed in claim 6, wherein the nested and determinable method is by default database order of schema metadata elements.

9. The method as claimed in claim 6, wherein the nested and determinable method is by creation date order of schema metadata elements.

10. The method as claimed in claim 6, wherein the nested and determinable method is by table owner of schema metadata elements.

11. The method as claimed in claim 1, wherein the execution of the primary application is controlled by halting execution of the primary application.

12. The method as claimed in claim 1, wherein the process obtains all available schema metadata.

13. The method as claimed in claim 1, wherein the process only obtains the schema metadata which would affect the primary application if that schema metadata were to change.

14. The method as claimed in claim 1, wherein the process utilizes Structured Query Language 92 standard to obtain schema metadata from the database.

15. The method as claimed in claim 1, wherein the process utilizes the database's Application Programming Interface (API) to obtain schema metadata from the database.

16. The method as claimed in claim 15, wherein the database's API is a Java database API.

17. A computer system for providing an indication of integrity of one or more databases for a plurality of applications including:
   I. a plurality of applications stored in memory and executed by a processor to execute the steps of:
      i. obtaining a first reference reduced representation by:
         a. applying a process to obtain first schema metadata of a database structure of a database, where the first schema metadata is schema metadata that is selected from a set of tables, columns in the tables, data types of columns, lengths of columns, custom database data types foreign keys, constraints, stored procedures, views, triggers, indices, and scheduled jobs;
         b. creating a first reference reduced representation of the first obtained schema metadata using an algorithm, where the algorithm is a hash function selected from a set of MD5 (Message-Digest algorithm 5) and CRC32 (Cyclic redundancy check 32); and
         c. storing the first reference reduced representation by embedding the first reference reduced representation within configuration files for a primary application;
      ii. during execution of the primary application, applying a process to obtain second schema metadata of the database structure of a same database, where the second schema metadata is selected from a set of tables, columns in the tables, data types of columns, lengths of columns, custom database data types foreign keys, constraints, stored procedures, views, triggers, indices, and scheduled jobs;
      iii. creating a second reduced representation of the second obtained schema metadata using the algorithm;
      iv. comparing the stored first reference reduced representation with the created second reduced representation so as to provide an indication of the integrity of the database by determining whether the database structure changed during a time when the first reference reduced representation and second reduced representation were obtained;
      v. controlling execution of the primary application dependent on the indication, where the execution of the primary application is controlled by the primary application sending an error message to one selected from a set of a user of the primary application, a manager of the primary application, a manager of the database and the database; and
      vi. requesting a schema stability lock to guarantee that a schema of the database does not change between subsequent database integrity verifications;
   II. a database configured to receive requests for schema metadata from the plurality of applications and to transmit schema metadata to the plurality of applications dependent on said indication.

18. The system as claimed in claim 17, wherein reduced representations are calculated using a lossless compression algorithm.

19. The system as claimed in claim 18, wherein the lossless compression algorithm is one selected from a set of zip, gzip, and bzip2.

20. The system as claimed in claim 17, wherein each previously calculated reduced representation is stored by embedding a representation within its associated application.

21. The system as claimed in claim 17, wherein each schema metadata is organized using a nested and determinable method before its reduced representation is calculated.

22. The system as claimed in claim 21, wherein the nested and determinable method is by alphabetical listing of schema metadata elements.

23. The system as claimed in claim 21, wherein the nested and determinable method is by default database order of schema metadata elements.

24. The system as claimed in claim 21, wherein the nested and determinable method is by creation date order of schema metadata elements.

25. The system as claimed in claim 21, wherein the nested and determinable method is by table owner of schema metadata elements.

26. The system as claimed in claim 17, wherein a result of each comparison controls execution of its associated application.

27. The system as claimed in claim 26, wherein the execution of the application is controlled by halting execution of the application.

28. The system as claimed in claim 17, wherein the plurality of applications are request a schema stability lock of the one or more databases.

29. The system as claimed in claim 17, wherein each application extracts all available schema metadata from each database.

30. The system as claimed in claim 17, wherein each application extracts the schema metadata which would affect the application if the schema metadata were to change.

31. The system as claimed in claim 17, wherein each application utilizes Structured Query Language 92 standard to extract the schema metadata from each database.

32. The system as claimed in claim 17, wherein each application utilizes the database's Application Programming Interface (API) to extract the schema metadata from each database.

33. The system as claimed in claim 32, wherein the database's API is a Java database API.

34. A system comprising a processor, a memory, and verification engine for providing an indication of integrity of a database comprising:
   I. an application;
   II. a stored reduced representation of schema metadata of the structure of a database; and
   III. a verification engine which upon connection to a database executes the steps of:
      i. obtaining a first reference reduced representation by:
         a. applying a process to obtain first schema metadata of a database structure of a database, where the first schema metadata is schema metadata that is selected from a set of tables, columns in the tables, data types of columns, lengths of columns, custom database data types foreign keys, constraints, stored procedures, views, triggers, indices, and scheduled jobs;
         b. creating a first reference reduced representation of the first obtained schema metadata using an algorithm, where the algorithm is a hash function selected from a set of MD5 (Message-Digest algorithm 5) and CRC32 (Cyclic redundancy check 32); and c. storing the first reference reduced representation by embedding the first reference reduced representation within configuration files for a primary application;

ii. during execution of the primary application, applying a process to obtain second schema metadata of the database structure of a same database, where the second schema metadata is selected from a set of tables, columns in the tables, data types of columns, lengths of columns, custom database data types foreign keys, constraints, stored procedures, views, triggers, indices, and scheduled jobs;

iii. creating a second reduced representation of the second obtained schema metadata using the algorithm;

iv. comparing the stored first reference reduced representation with the created second reduced representation so as to provide an indication of the integrity of the database by determining whether the database structure changed during a time when the first reference reduced representation and second reduced representation were obtained; and v. controlling execution of the primary application dependent on the indication, where the execution of the primary application is controlled by the primary application sending an error message to one selected from a set of a user of the primary application, a manager of the primary application, a manager of the database and the database; and vi. requesting a schema stability lock to guarantee that the schema of the database does not chance between subsequent database integrity verifications.

35. The system as claimed in claim 34, wherein the stored reduced representation is stored by embedding the representation within the application.

36. The system as claimed in claim 35, wherein each schema metadata is organized using a nested and determinable method before its reduced representation is calculated.

37. The system as claimed in claim 34, wherein the application is controlled by halting execution of the application.

* * * * *